United States Patent

[11] 3,582,908

[72] Inventor James T. Koo
Walnutport, Pa.
[21] Appl. No. 805,673
[22] Filed Mar. 10, 1969
[45] Patented June 1, 1971
[73] Assignee Bell Telephone Laboratories, Incorporated
Murray Hill and Berkeley Heights, N.J.

[54] WRITING A READ-ONLY MEMORY WHILE PROTECTING NON-SELECTED ELEMENTS
4 Claims, 2 Drawing Figs.

[52] U.S. Cl. .......... 340/173
[51] Int. Cl. .......... G11c 7/02, G11c 11/48
[50] Field of Search .......... 340/173, 173.2, 173 SPM, 174 SPM

[56] References Cited
UNITED STATES PATENTS

| | | | |
|---|---|---|---|
| 2,947,977 | 8/1960 | Bloch | 340/174 |
| 3,028,659 | 4/1962 | Chow | 340/173UX |
| 3,048,824 | 8/1962 | Thompson | 340/173 |
| 3,091,754 | 5/1963 | Nazare | 340/173UX |
| 3,377,513 | 4/1968 | Ashby | 340/173UX |
| 3,445,824 | 5/1969 | Fulenwider | 340/173.2X |

OTHER REFERENCES

Tompkins, " Random Interconnection Matrix, RCA Technical Notes," No. 470, 9/61, 2 sheets
Young, "Read Only Memory" IBM Technical Disclosure Bulletin, Vol. 5, No. 1, 6/62, page 26

*Primary Examiner*—Terrell W. Fears
*Assistant Examiner*—Stuart Hecker
*Attorneys*—R. J. Guenther and Kenneth B. Hamlin

ABSTRACT: A resistive read-only memory is manufactured initially with all of its resistor cross-point connections intact. Thereafter information is written into the memory by destroying selected resistor cross-point connections by applying a voltage across each row and column circuit combination uniquely defining one of the selected cross-points The voltage drives destructive current through the selected cross-points but nonselected resistor cross-points are preserved intact by simultaneously biasing nonselected row and column circuits to respective lower voltage levels. Apparatus is also indicated for applying the aforementioned voltages.

INVENTOR
J. T. KOO
BY
Charles Scott Phelan
ATTORNEY

WRITING A READ-ONLY MEMORY WHILE PROTECTING NON-SELECTED ELEMENTS

BACKGROUND OF THE INVENTION

1. Field of the Invention

This invention relates to read-only memories, and it relates more particularly to a method and apparatus for electronically writing information into such a memory which includes impedance elements at the cross-points thereof.

2. Description of the Prior Art

Read-only memory matrices with impedance elements electronically connecting row and column circuits thereof are well known. The use of such read-only memories has been inhibited in large measure because they have heretofore been comparatively costly to manufacture. One reason has been the need to establish the desired information pattern at the time of manufacture rather than at the time of need in the field. For an integrated circuit system, it is necessary to use different masks for forming each new information pattern which it is desired to establish in a memory.

Some read-only memories in the prior art have been formed by selectively destroying memory cross-points with the application of sufficient current to destroy a circuit element in a selected cross-point, e.g., by vaporizing the element in the manner of a fuse. However, writing into memories of this type necessarily requires that such memory include as an integral part thereof some means to prevent current flow through sneak paths in the memory matrix, for the availability of such paths so reduces the total resistance of the matrix that one is almost certain to destroy some nonselected memory cross-point circuits.

SUMMARY OF THE INVENTION

The present invention contemplates resolution of the aforementioned prior art problems by biasing all row and column circuits of an impedance memory matrix to various predetermined bias levels so that destructive current magnitude can be conveniently applied to selected cross-point impedance circuits, but only a fraction of the destructive current magnitude can flow in any nonselected impedance element cross-points It is one feature of the invention that impedance matrices for read-only memories are manufactured in accordance with a uniform format wherein all cross-point circuits are formed initially.

It is another feature that impedance element matrices for read-only memories are conveniently electronically written in the field by means of access circuits similar to those normally employed by data processing systems that use such read-only memories.

It is a further feature that the utilization of the described memory matrix biasing arrangement permits the realization of safety margins of up to 9 to 1.

Yet another feature is that the various memory row and column rail circuit bias levels are applied in a preprogrammed sequence to prevent accidental destruction of nonselected memory cross-point circuits.

BRIEF DESCRIPTION OF THE DRAWING

The aforementioned invention and its various features, objects, and advantages may be more readily understood upon a consideration of the following description together with the appended claims and the attached drawing in which:

DETAILED DESCRIPTION

Figure 1:
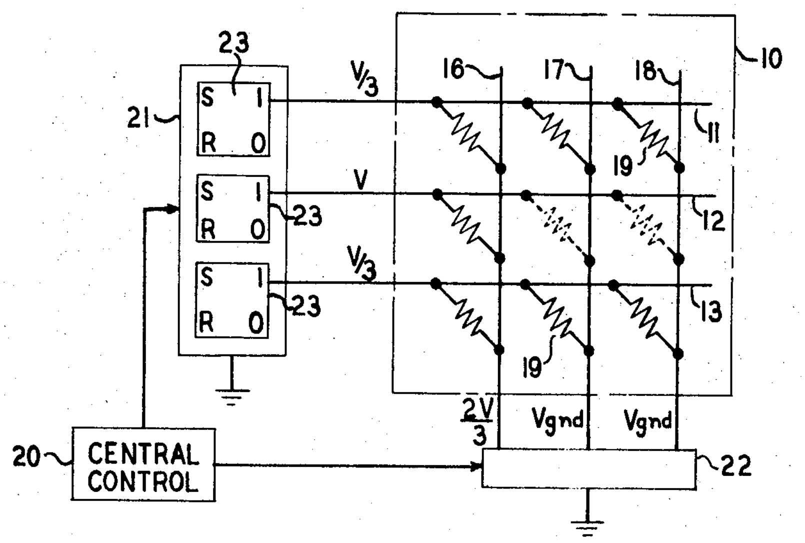
FIG. 1 depicts, partially in block and line diagram form and partially in schematic form, a memory writing arrangement in accordance with the invention.

In FIG. 1 impedance matrix 10 includes row rail circuits 11, 12, and 13 and column rail circuits 16, 17, and 18 which are orthogonally arranged with respect to the mentioned row circuits. Each intersection of row and column circuits defines a memory matrix cross-point; and the respective row and column circuits at each such cross-point are interconnected by impedance elements. Such elements are represented in the drawing by resistors 19. Matrix 10 is, thus, really a network of resistors that are interconnected to form multiple bilaterally conductive current paths between the terminals of any one of the resistors. The matrix is initially manufactured by well-known techniques, advantageously integrated circuit techniques, to include the different resistor elements 19, all of substantially the same resistance, connected between each row circuit and every column circuit intersected thereby. Resistor material and resistances will be determined by the type of application in which the matrix will be employed, but the resistors have a predetermined destruct voltage magnitude limit at which current through the resistor causes destruction thereof. Only six rails and nine resistors 19 (only two of which are indicated by the reference character) of a resistor matrix are shown in FIG. 1, but a larger matrix array is indicated schematically by the extensions of rail circuits 11–13 to the right and 16–18 upward beyond the illustrated resistors 19.

The ultimate user of such a matrix provides in his program-controlled data processing system a central control 20, a row register 21, and a column register 22. The data processing system is advantageously employed to write information into the matrix 10, but manually operated bias arrangements could also be used for the writing operation. Complete details of central control 20 and the two registers, and of the overall data processing system, are not illustrated since several forms therefor are well known in the art and comprise no part of the present invention. The registers 21 and 22 advantageously include, for example, an array of bistable, or flip-flop, circuits, such as the circuits 23 shown in row register 21. A flip-flop is provided in register 21 for each row circuit and in register 22 for each column circuit.

Each flip-flop circuit in the row register 21 includes an output connection which is coupled to a corresponding row circuit in the matrix 10. Those output connections advantageously rest at a voltage level V, e.g., 10 volts, or a voltage level $v/3$, depending upon the binary state of the flip-flop circuit as determined by central control 20. The flip-flop circuits of register 22 similarly include output connections coupled to the respective column circuits of matrix 10, and those connections advantageously rest either at ground Vgnd, or at a voltage $2v/3$ as determined by central control 20. All of the aforementioned flip-flop circuits are adapted in a manner well known in the art to function as voltage sources to provide the indicated output voltages at various output current levels determined by the resistance available in the matrix 10.

Central control 20 includes a writing program for establishing predetermined binary coded information words in selected rows of the read-only memory matrix 10. Although a single word can be written in single simultaneous application of all bias voltages, a programmed application is advantageously employed as described herein. Details of program decoding and accessing are well known in the art and so are considered here only to the extent necessary to describe the operation of the invention. In accordance with the information coding, the presence of a resistor at a selected cross-point represents a binary ZERO, and the absence of such a resistor represents a binary ONE. The program sequence is illustrated by the voltage diagrams of FIG. 2. Central control 20 first causes all of the flip-flops of registers 21 and 22 to be reset for providing at their output connections which are coupled to matrix row and column circuits the lower one of their available output voltages. Thus, register 21 initially applies, at zero time in FIG. 2, the voltage $v/3$ to all of the row circuits 11–13; and register 22 similarly applies the ground reference voltage to all of the column circuits 16–18.

During the second step in the writing program selected flip-flop circuits of register 22 are set at time $t_1$ to apply the voltage $2v/3$ to their corresponding column circuits in accordance with the information to be written. Assume that a binary work is to be written into the row of circuit 12 in the matrix 10 and that the word includes the digits 0–1–1 in the three leftmost bit positions illustrated. The two resistors interconnecting row circuit 12 and column circuits 17 and 18 must be destroyed. Those resistors are shown in broken-line form in FIG. 1. The register 22 flip-flop circuit which is coupled to column circuit 16 is set to raise the bias on that column circuit from ground to the voltage $2v/3$ with respect to ground. Register flip-flop circuits coupled to columns 17 and 18 continue to rest in the reset state and hold column circuits 17 and 18 at ground. These information-representative column circuit conditions may be established by central control 10 in a sequence of operations on the respective column circuits or simultaneously in a bit-parallel signal application.

During the third step of the program, at time $t_2$, central control 20 sets the register 21 flip-flop which is coupled to the row circuit 12 in which the information is to be written. That flip-flop raises the bias on that row circuit from the voltage $v/3$ to the voltage V. Row circuits 11 and 13 remain biased at the voltage $v/3$. At this point the total voltage V is applied across the broken-line resistors 19 which interconnect the row circuit 12 with the column circuits 17 and 18. That voltage is sufficient to supply current in excess of the destructive current magnitude to such resistor cross-points, and they are accordingly destroyed. Such current is not, however, sufficient to affect adversely any matrix rail circuits as is well known in the art.

After the two selected resistors have been destroyed, the applied voltages linger for a finite time before they can be removed. In the described resistor matrix, plural sneak current paths are available between terminals where selected cross-point resistors 19 had been from row 12 to columns 17 and 18. All such current paths are bilateral since there are no unilateral conduction elements in either the rails or the cross-points of the matrix. In the worst case, the sneak current paths include a single nonselected resistor 19 in series with a network of other nonselected resistors 19 so that the single resistor must carry the full applied current.

The writing of 0–1–1 in the illustrated part of row 12 leaves a matrix resistance of about 1¾R, where R is the resistance of a single one of the resistors 19, when two cross-point resistors are destroyed at the same time; and the resulting current is too small to destroy and additional resistors, even without the use of the present invention. However, when considering the full matrix in the absence of the present invention, if one continues to assume the rapid procedure of simultaneously destroying all selected ones of the resistors 19, the danger of destroying nonselected resistors 19 increases greatly. Looking to a slower procedure for writing the matrix, a single resistor is destroyed at a time; and it can be shown that the worst case matrix resistance after destruction of the selected cross-point resistors is given by the expression $$\left(1+\frac{2}{n-1}\right)R$$

where $R$ is the resistance of a single cross-point resistor 19 and $n$ is the total number of matrix column circuits. Thus, in the part of the matrix shown in FIG. 1 there are three columns, and the approximate resistance presented to a selected row rail circuit and a selected column rail circuit when destroying a single resistor at a time is 2R. Considering an entire matrix of as few as 21 columns, the resistance becomes 1.1R, and the resistance approaches the value R as the number of columns increases. The applied current similarly approaches the destruct current limit of the cross-point resistors. Difficulties encountered in controlling resistor characteristics during manufacture and in regulating applied current magnitude during writing to destroy a selected resistor of resistance R, without destroying nonselected resistors, are apparent. Such difficulties make the risk of false destruction intolerably great.

On the other hand, in accordance with an aspect of the present invention, the nonselected column circuits are biased to the voltage $2v/3$ and the nonselected row circuits are biased to the voltage $v/3$. The voltage difference across all nonselected cross-point resistors 19 is, thus, necessarily limited to the magnitude $v/3$. Regardless of resistor network configuration, the limitation remains. Accordingly, only a fraction of the destructive current magnitude can possibly flow through any of the nonselected cross-point resistors, and it is too small to destroy any nonselected resistors.

Figure 2:
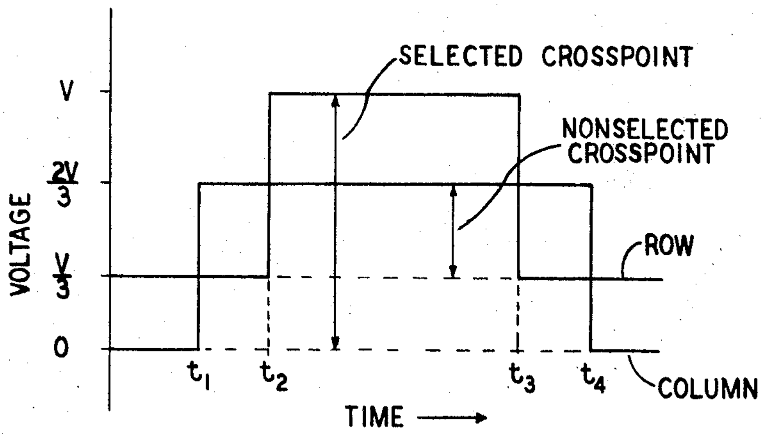
FIG. 2 is a set of voltage diagrams illustrating the operation of the invention.

It is further observed in FIG. 2 that there is a fixed polarity relationship among bias voltage differences across different groups of nonselected cross-point resistors. Thus, all such resistors which are connected to a selected row or column circuit are biased so that their row terminals are positive with respect to their column terminals. However, all other cross-point resistors are biased so that their row terminals are negative with respect to their column terminals.

The conventional electric circuit equations make it apparent that the power dissipation in nonselected cross-point resistors subjected to a voltage difference of $v/3$ is one-ninth of the power dissipation in selected cross-point resistors subjected to the voltage difference V. A safety margin of 9 to 1 is, therefore, available when determining what current magnitudes and degree of voltage regulation will be required to avoid false destruction of cross-point resistors. Voltage proportions other than those indicated in FIG. 2 can, of course, be employed for determining the values of row and column circuit bias levels. However, for arrangements such as that described wherein three voltage levels in addition to a reference level are required, the use of voltages V, $v/3$, and $2v/3$ provides the optimum safety margin of 9 to 1.

Upon destruction of the selected, broken-line resistor cross-points as just outlined, the program causes the flip-flops of registers 21 and 22 to be reset in that order at times $t_3$ and $t_4$ to be sure that no nonselected resistors are destroyed. Thereafter, information is written into other rows of the matrix 10 by the same techniques for biasing selected cross-points to a voltage difference V while nonselected cross-points are biased to a voltage difference $v/3$.

I claim:

1. In combination:

a plurality of impedance elements interconnected to form multiple bilateral current paths between terminals of any one of said elements, said paths including row and column circuits of a matrix in which said elements are cross-point circuits interconnecting said row and column circuits, means driving through at least a selected one of said elements a current of sufficient magnitude to destroy such element, a selected element interconnecting a selected row circuit and a selected column circuit, said driving means comprising means coupling each selected column circuit to a voltage reference, and means applying to each selected row circuit a first voltage with respect to said voltage reference, means biasing all nonselected ones of said elements in said paths between terminals of said selected element to limit current in each such path to a magnitude that is insufficient to destroy any of said nonselected elements, said biasing means cooperating with said driving means and further including means biasing nonselected column circuits to a second voltage with respect to said voltage reference, said second voltage being smaller than said first voltage, and means biasing nonselected row circuits to a third voltage with respect to said voltage reference, said third voltage being smaller than said second voltage.

2. In combination:

an impedance matrix having row and column circuits orthogonally arranged and interconnected at intersections thereof by respective impedance elements, each of said elements having a predetermined destruct voltage magnitude limit at which current through the element causes destruction thereof, means applying across a selected row circuit and a selected column circuit a voltage at least equal to said voltage limit for driving destructive current through the one of said impedance elements interconnecting such row and column circuit, means simultaneously biasing nonselected ones of said row and column circuits to voltage magnitudes which are less than said voltage limit for thereby limiting the magnitude of voltage appearing across every nonselected one of said impedance elements to a predetermined fraction of said destruct voltage magnitude limit, and means programming operation of said biasing means and said applying means to operate them in a predetermined sequence for thereby limiting voltage magnitude across said nonselected impedance elements, said programming means comprising means biasing each of said row circuits to approximately one-third of said voltage across said selected row and column circuits, means thereafter biasing said column circuits to either a reference voltage or a voltage which is approximately two-thirds of said voltage across said selected row and column circuits in accordance with predetermined information to be written into cross-point impedance elements connected to one of said row circuits, said column circuits which are biased to said reference voltage being selected column circuits, and means biasing said selected row circuit to a voltage at least equal to said voltage limit.

3. The combination in accordance with claim 2 in which:

said impedance elements are resistors of substantially the same magnitude throughout said matrix.

4. The method for writing information into a read-only memory comprising plural row and column circuits interconnected at cross-points thereof by separate resistors, the method comprising the steps of applying a first voltage to all of said row circuits, applying a second and larger voltage to predetermined ones of said column circuits, and applying a third still larger voltage across each series combination of a selected one of said row circuits and each remaining one of said column circuits.